(12) United States Patent
Quigley et al.

(10) Patent No.: US 8,131,302 B2
(45) Date of Patent: Mar. 6, 2012

(54) METHOD AND SYSTEM FOR DYNAMICALLY SPLITTING JOBS ACROSS MULTIPLE AGNOSTIC PROCESSORS IN WIRELESS SYSTEM

(75) Inventors: Thomas Quigley, Franklin, NC (US); Alexander G. MacInnis, Ann Arbor, MI (US); Arya Behzad, Poway, CA (US); Jeyhan Karaoguz, Irvine, CA (US); John Walley, Ladera Ranch, CA (US); Mark Buer, Gilbert, AZ (US)

(73) Assignee: Broadcom Corporation, Irvine, CA (US)

( * ) Notice: Subject to any disclaimer, the term of this patent is extended or adjusted under 35 U.S.C. 154(b) by 1100 days.

(21) Appl. No.: 11/968,588

(22) Filed: Jan. 2, 2008

(65) Prior Publication Data

US 2009/0023452 A1    Jan. 22, 2009

Related U.S. Application Data

(60) Provisional application No. 60/950,982, filed on Jul. 20, 2007.

(51) Int. Cl.
*H04W 72/00* (2009.01)
(52) U.S. Cl. ........................ 455/450; 455/452.2; 370/338
(58) Field of Classification Search ....... 455/450–452.2, 455/41.2, 434, 67.11; 370/338, 328, 329
See application file for complete search history.

(56) References Cited

U.S. PATENT DOCUMENTS

| 6,594,507 | B1 * | 7/2003 | Friman | 455/560 |
| 6,907,243 | B1 * | 6/2005 | Patel | 455/442 |
| 7,031,720 | B2 * | 4/2006 | Weerakoon et al. | 455/452.2 |
| 7,274,662 | B1 * | 9/2007 | Kalmanek et al. | 370/230 |
| 7,305,241 | B2 * | 12/2007 | Hirvonen et al. | 455/453 |
| 7,616,961 | B2 * | 11/2009 | Billhartz | 455/452.2 |
| 7,715,837 | B2 * | 5/2010 | Lehtovirta et al. | 455/424 |
| 7,885,222 | B2 * | 2/2011 | Cole | 370/328 |
| 7,953,035 | B2 * | 5/2011 | Gopal | 370/328 |
| 2004/0082338 | A1 * | 4/2004 | Norrgard et al. | 455/452.2 |
| 2008/0040417 | A1 * | 2/2008 | Juncker | 709/201 |

OTHER PUBLICATIONS

Seagate Technology LLC, Seagate D.A.V.E (Digital Audio Video Experience) Transform the comsumer digital content experience with the Seagate D.A.V.E. design concept, Data Sheet, 2007.
Seagate Technology LLC, Seagate D.A.V.E. (Digital Audio Video Experience) The portable storage platform that collects, plays and manages digital content, Product Overview, 2007.

* cited by examiner

*Primary Examiner* — Sharad Rampuria
(74) *Attorney, Agent, or Firm* — Thomas, Kayden, Horstemeyer & Risley, LLP

(57) ABSTRACT

Dynamically splitting jobs in wireless system between agnostic processor may comprise evaluating a job that a wireless mobile communication device may be requested to perform. The wireless mobile communication (WMC) device may evaluate a requested job to determine if one or more tasks may be sent to a remote device. The WMC device may consider such factors as information pertaining to the WMC device itself, information relating to the connection between the devices, and/or information pertaining to the remote device. This information may comprise such data as power availability in the wireless mobile communication device, processing load in the WMC device, processing and/or storage capabilities of the remote device, and characteristics of the connectivity between the two devices.

27 Claims, 6 Drawing Sheets

METHOD AND SYSTEM FOR DYNAMICALLY SPLITTING JOBS ACROSS MULTIPLE AGNOSTIC PROCESSORS IN WIRELESS SYSTEM

CROSS-REFERENCE TO RELATED APPLICATIONS/INCORPORATION BY REFERENCE

This patent application makes reference to, claims priority to and claims benefit from U.S. Provisional Application Ser. No. 60/950,982 filed on Jul. 20, 2007.

The above stated application is hereby incorporated herein by reference in its entirety.

FIELD OF THE INVENTION

Certain embodiments of the invention relate to wireless devices. More specifically, certain embodiments of the invention relate to a method and system for dynamically splitting jobs across multiple agnostic processors in wireless system.

BACKGROUND OF THE INVENTION

The field of wireless communication has seen dramatic growth the last few years. In today's world, most people use their wireless devices for various purposes, business and personal, on a constant and daily basis. Society is truly becoming a wireless one. Numerous wireless solutions have been introduced, and have made a tremendous impact on everyday life.

For example, the use of Wireless Personal Area Networks (WPAN) has been gaining popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). WPAN may be based on standardized technologies, for example Class 2 Bluetooth (BT) technology. While WPAN may be very beneficial for certain applications, other applications may require larger service areas and/or capabilities.

To satisfy such needs, other technologies have been developed to provide greater wireless service. Wireless Local Area Networks (WLAN) systems may operate within a 100-meter range, for example. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Other forms of wireless solutions have evolved from traditional land-based communication technologies. For instance, cellular phones have become just about an absolute necessity in today's world. While cellular technology was merely intend to add an element of mobility to the traditional telephony service, this technology has grown beyond that initial purpose. Many modern cellular technologies, including such technologies as GSM/GPRS, UMTS, and CDMA2000, incorporate substantial data capabilities. Most of today's cellular services include such features as text messaging, video streaming, web browsing . . . etc.

Combining various wireless technologies is another trend in the wireless world. For instance, WLAN systems may be operated in conjunction with WPAN systems to provide users with an enhanced overall functionality. For example, Bluetooth technology may be utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building.

Devices aimed at taking advantage of the capabilities of wireless networks can be described as Wireless mobile communication (WMC) devices. Today's WMC devices may comprise such devices as cellular phones, PDA's, laptops, and/or other devices.

WMC devices are typically designed to be carried around, and used on the move; therefore, physical limitations remain a major consideration in designing these devices. Increases in the size and weight of WMC devices may be disfavored; rather, decreasing the size and weight of WMC device may be more consistent of with more convenient use of these WMC devices. There is a limit on the amount of processing and storage that can be packed into WMC devices without causing increase in size and weight. Increases in processing and/or storage generally require use of additional components; however, WMC devices' manufactures generally shy away from putting too many components in these devices because of said physical limitations. Therefore, despite the general rapid development in the overall electronics industry, WMC devices continued to lag behind other devices in processing and/or storage capabilities.

In addition to physical limitations, power remains another major limitation in WMC devices. While the battery technology has seen dramatic improvement in recent years, it has generally been unable to keep with the explosive growth in electronic technology. Therefore, battery power remains a major bottleneck in the operability of WMC device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for an algorithm for dynamically splitting jobs across multiple agnostic processors in a wireless system, substantially as shown in and/or described which may be utilized in accordance with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for dynamically splitting jobs across multiple agnostic processors in a wireless system. Exemplary aspects of method and system for dynamically splitting jobs in a wireless system may comprise evaluating a job that a wireless mobile communication (WMC) device may be requested to do. Wireless mobile communication (WMC) devices may have limited power supply due to use of batteries. Furthermore, because of the physical limitations of the WMC devices, mainly because WMC device users prefer keeping WMC devices light and small, WMC devices may have less processing and/or storage capabilities then other devices. Where a WMC device user may request a job to be performed in the WMC device, it may be desirable to assign some of the necessary work to remote devices to improve performance and/or to save power in the WMC device. The WMC device may evaluate the requested job and determine one or more tasks that may be assigned to remote devices. The WMC device may consider plurality of factors in making the job evaluation and task assignment decisions. For example, the WMC device may consider its wireless connectivity abilities, its power restraints, and the processing and storage capabilities of the remote devices and/or the WMC device itself.

Figure 1:
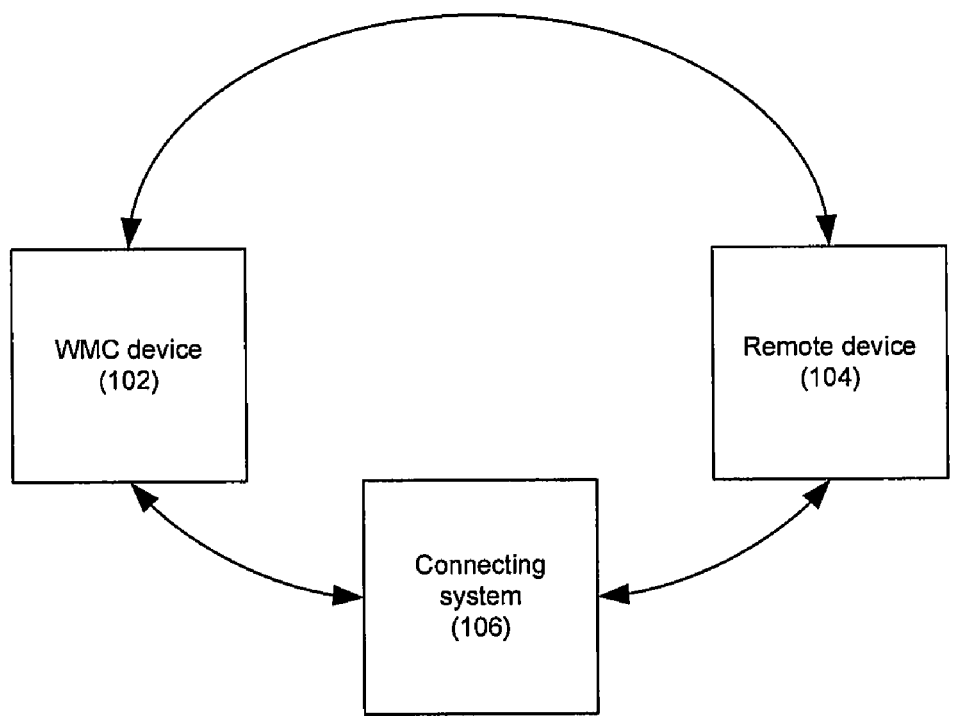
FIG. 1 is a block diagram that illustrates an exemplary communication setup between a wireless mobile communication (WMC) device and a remote device, which may be utilized in accordance with an embodiment of the invention.

FIG. 1 is a block diagram that illustrates an exemplary communication setup between a wireless mobile communication (WMC) device and a remote device, which may be utilized in accordance with an embodiment of the invention. Referring to FIG. 1, there is shown a wireless mobile communication (WMC) device 102, a remote device 104, and a connecting system 106.

The WMC device 102 may comprise suitable hardware, logic, circuitry and/or code that may enable performing wireless mobile communication. The WMC device 102 may perform additional functionality including, but not limited to, internet browsing, video streaming . . . etc.

The remote processing resource 104 may comprise suitable hardware, logic, circuitry and/or code that may be enabled to communicate to with the WMC device 102. The invention may not be limited to a specific remote processing resource, but may comprise for example, a general purpose processing device, a specialized processing device, a specialized peripheral device, or any combination of suitable hardware, firmware, software and/or code, which may be enabled to perform a job requested by the WMC device 102. For example, the remote processing resource may comprise a home PC that may comprise fast processing subsystems and increased memory space. Such home PC may be better suited to perform processing and/or storage intensive tasks. For instance, where necessary and/or feasible, the WMC device 102 may utilize the remote processing resource 104 to perform Internet searches and/or for secure storage of data that may be created and/or maintained in the WMC device 102.

The connecting system 106 may comprise a plurality of interconnecting networks and suitable hardware, logic, circuitry and/or code that may be enabled to facilitate end-to-end communication between the WMC device 102 and the remote processing resource 104. The connecting system 106 may comprise wireless and/or wired networks that may be enabled to communicate and forward messaging and/or data between the WMC device 102 and the remote processing resource 104.

In operation, the WMC device 102 may communicate directly with the remote device 104 if the devices were enabled to communicate directly, or the WMC device 102 may communicate with the remote device 104 through the connecting system 106. The WMC device 102 may be requested to perform a job. For example, a user may attempt to execute an internet search and/or database sorting on the WMC device 102. The WMC device may determine that one or more tasks, which may be necessary to perform the requested job, may be run in the remote device 104. The WMC device 102 may determine that running said task or tasks may be more efficient in the remote device 104. The task assignment may be determined based on a algorithm that may considered plurality of factors including, but not limited to, availability of battery life in the WMC device 102, expected power need for performing the tasks, processing gaining for performing the task or tasks in the remote device 102, and characteristics of the connection between the remote device 104 and the WMC device 102.

Once one or more tasks are designated, the one or more tasks may be assigned to the remote device 104. The assignment of the tasks may be communicated to the remote device 104 from the WMC device 102 either directly or via the connecting system 106. The results of performing the task or tasks in the remote device 104 may be communicated back to the WMC device 102 either directly or via the connecting system 106.

Figure 2A:
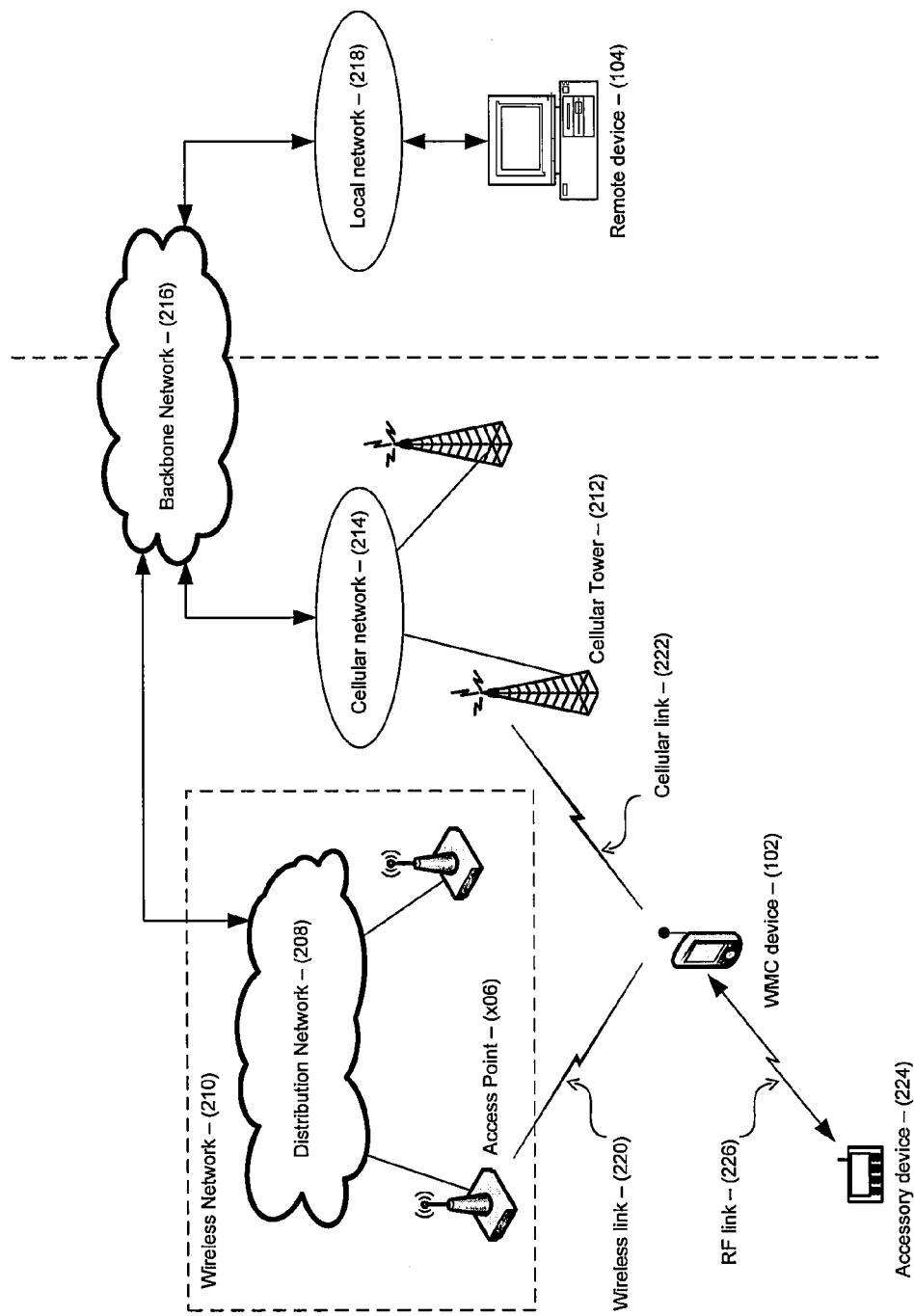
FIG. 2A is a block diagram that illustrates an exemplary model for setup that includes a wireless mobile communication (WMC) device and a remote device, which may be utilized in accordance with an embodiment of the invention.

FIG. 2A is a block diagram that illustrates an exemplary model for setup that includes a wireless mobile communication (WMC) device and a remote device, which may be utilized in accordance with an embodiment of the invention. Referring to FIG. 2A, there is shown the WMC device 102, the remote device 104, an access point 206, a distribution network 208, a wireless network 210, a cellular tower 212, a cellular network 214, a backbone network 216, a local network 218, a wireless link 220, a cellular link 222, an accessory device 224, and an RF link 226.

The wireless network 210 may comprise a plurality of the access point 206, the distribution network 208 and suitable hardware, logic, circuitry and/or code that may enable implementing a functional block corresponding to a wireless technology. Exemplary wireless technology may comprise for example the IEEE 802.11 (WLAN) or WiMax (802.16) architecture. The access point 206 may comprise suitable hardware, logic, circuitry, and/or code that may be utilized as access point necessary for the WMC device 102 to access the wireless network 210. The distribution network 208 may comprise suitable hardware, logic, circuitry, and/or code that may be adapted to operate as a backbone network that may be responsible for transport and link functionality for plurality of access points in the wireless network 210.

The cellular network 214 may comprise plurality of the cellular tower 212, and suitable hardware, logic, circuitry and/or code that may enable implementing a functional block corresponding to a cellular technology. Exemplary cellular technology may comprise cellular technologies that enable data services, including but not limited to, CDMA, WCDMA, CDMA2000, HSDPA, GSM, GPRS, EDGE, and UMTS.

The accessory device 224 may comprise suitable hardware, logic, circuitry and/or code that may enable performing some accessory functionality in conjunction with the use of the WMC device 102. For example, the accessory device 224 may comprise a hands-free headset. The WMC device 102 may interact with the accessory device 224 over a short-range RF link 226. The RF link 226 may be based on a standardized technology for inter-device short range communication. For example, the RF link 226 may correspond to a Bluetooth® connection, Zigbee or other personal area network (PAN) connection between the accessory device 224 and the WMC device 102.

The local network 218 may comprise suitable hardware, logic, circuitry and/or code that may enable local connectivity. This local connectivity may comprise use of Local Area Network (LAN) technologies that enable data services, including but not limited to, IEEE 802.3 Ethernet.

The backbone network 216 may comprise suitable hardware, logic, circuitry, and/or code that may be adapted to provide overall system connectivity between sub-networks. The wired network 216 may be enabled to interact with, and connect different wired and wireless technologies. For example, the backbone network may comprise a standard telephony network that may enable data connectivity between different interface nodes linking wired and/or wireless networks comprising WLAN networks, WiMax networks, cellular networks, and/or LAN networks.

In operation, the WMC device 102 may utilize a wireless link 220 to access the wireless network 210 via the access point 206. The WMC device 102 may also utilize the cellular link 222 to access the cellular network 214 via the cellular tower 212. The WMC device 102 may attempt to communicate with the remote device 104 via the wireless network 210 through the access point 206 and the distribution network 208. The distribution network 208 may enable forwarding messaging and/or data sent from, and to the WMC device 102. The backbone network 216 enables connectivity between local networks, for example wireless network 210, and cellular network 214. The remote device 104 may receive communication from the WMC device 102 by interacting with the backbone network 216. Necessary protocol-based operations may be performed to facilitate the transmission of information through all the different components. This may comprise use of such protocols as IP, SS7 . . . etc.

Figure 2B:
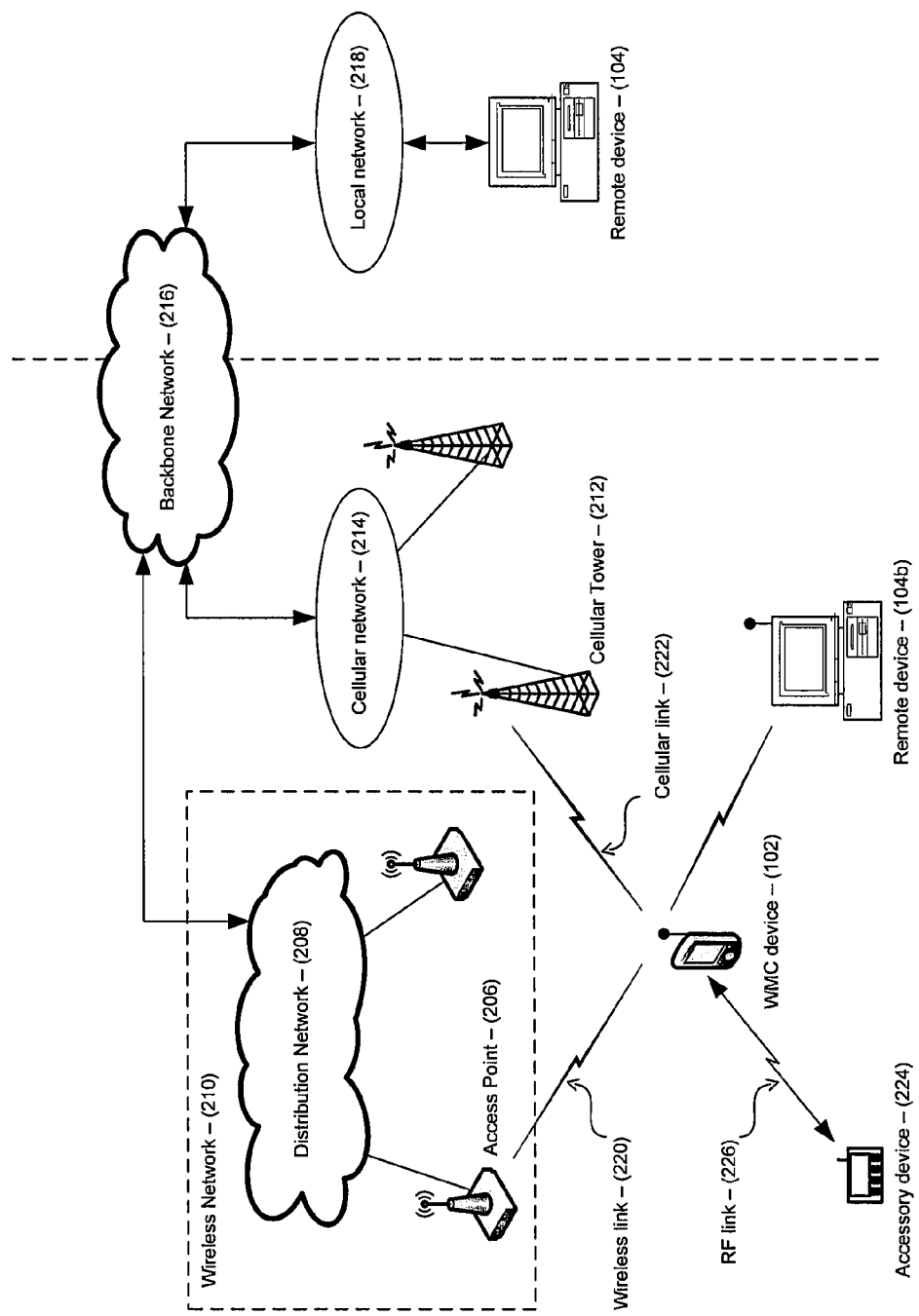
FIG. 2B is a block diagram that illustrates an exemplary model for setup that includes a wireless mobile communication (WMC) device communicating directly via a wireless connection with a remote device, which may be utilized in accordance with an embodiment of the invention.

FIG. 2B is a block diagram that illustrates an exemplary model for setup that includes a wireless mobile communication (WMC) communicating directly via a wireless connection with a remote device, which may be utilized in accordance with an embodiment of the invention. Referring to FIG. 2B, there is shown the WMC device 102, the remote device 104, the access point 206, the distribution network 208, the wireless network 210, the cellular tower 212, the cellular network 214, the backbone network 216, the accessory device 224, the RF link 226, and a remote device 104b.

The remote device 104b may be comprised similar to the remote device 104, however, the remote device 104b may also comprise suitable hardware, logic, circuitry, and/or code that may enable wireless connectivity.

In operation, the WMC device 102, the remote device 104, the remote device 104, the access point 206, the distribution network 208, the wireless network 210, the cellular tower 212, the cellular network 214, the backbone network 216, the accessory device 224, and the RF link 226 may operate similar FIG. 2A. The remote device 104b may operate similar to the remote device 104. However, the WMC device 102 may communicate directly with the remote device 104b over a wireless connection. The remote device 104b may be operated as a stand-alone device, or it may be operated within a compatible network, wherein the remote device may be integrated. The ability to communicate directly with the remote device 104b may allow improved utilization of the remote device 104b by the WMC device 102. The direct wireless connection between the WMC device 102 and the remote device 104b may enable faster and more reliable communication between the two devices. The improvement may be due to the characteristics of the wireless connection between the remote device 104b and the WMC device 102, for example having greater bandwidth. The improvement may also be due to reduced delays compared to setups where the WMC device may have to communicate with the remote device 104 through plurality of connecting networks and/or entities.

Figure 2C:
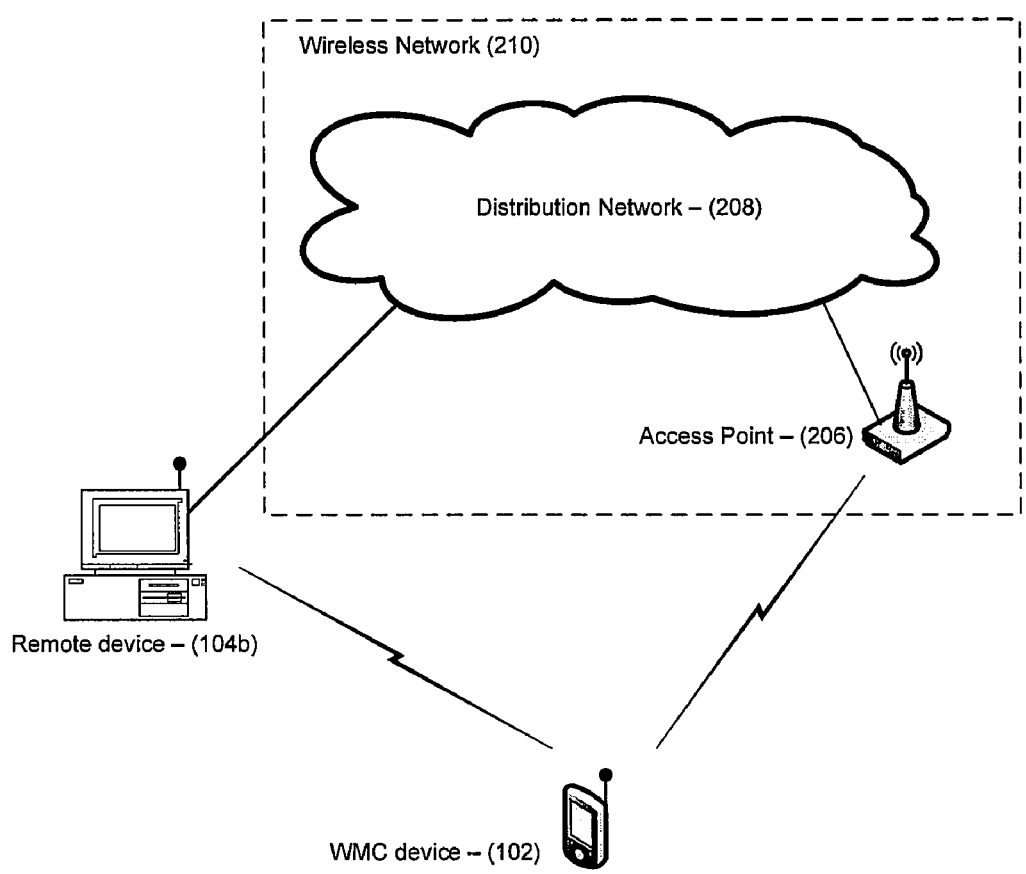
FIG. 2C is a block diagram that illustrates an exemplary model for setup that includes a wireless mobile communication (WMC) device communicating directly with a remote device that is connected to the same wireless network, which may be utilized in accordance with an embodiment of the invention.

FIG. 2C is a block diagram that illustrates an exemplary model for setup that includes a wireless mobile communication (WMC) device communicating directly with a remote device that is connected to the same wireless network, which may be utilized in accordance with an embodiment of the invention. Referring to FIG. 2C, there is shown the wireless mobile communication (WMC) device 202, the access point 206, the distribution network 208, the wireless network 210, and the remote device 104b.

In operation, the WMC device 102 may utilize the remote device 104b substantially as described in FIG. 2B. The WMC device 102 may communicate directly with the remote device 104b over a wireless connection. Additionally, The WMC device 102 may also communicate with the remote device 104b via the wireless network 210 by accessing the distribution network 208 through the access point 206.

Figure 3:
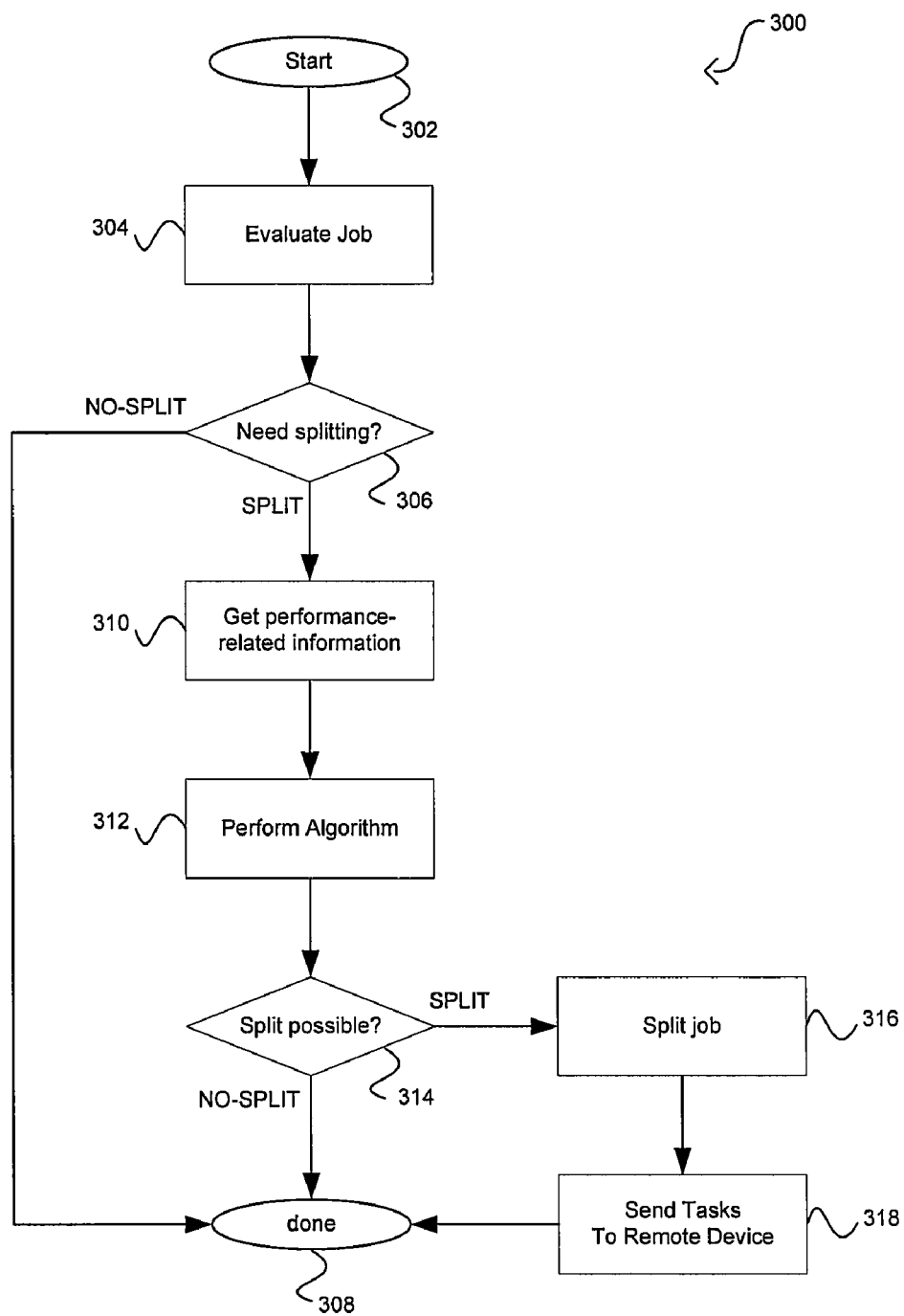
FIG. 3 is a flow diagram that illustrates a dynamic job splitting between a wireless mobile communication (WMC) device and a remote device, in accordance with an embodiment of the invention.

FIG. 3 is a flow diagram that illustrates a dynamic job splitting between a wireless mobile communication (WMC) device and a remote device, in accordance with an embodiment of the invention. Referring to FIG. 3, there is shown a flow chart 300. In step 302, a job is requested in the WMC device 102. In 304, a job evaluation is performed in the WMC device 102. This includes estimating the amount of processing, storage, power and other similar parameters that would be required to perform the job. In step 306, a determination if there is need to split the job is performed. This may include evaluating the cost of performing the job wholly within the WMC device 102 compared to the benefit of dividing the job and transmitting/receiving any assigned sub-tasks. In instance where it may be determined not to split the job, the process may proceed to step 308, where the process is done. The WMC device 102 may not attempt to apportion any tasks to remote device 104, and the WMC device 102 may attempt to perform the requested job completely.

In instances where it may be determine to split the job, the process may proceed to step 310. In step 310, the WMC device 102 obtains information about the remote device 104 that may be utilized in performing the job. This may comprise exemplary information such as the processing capability/load of the remote devices, available storage space.

In step 312, job splitting may be performed. In step 314, it may be determined whether the requested job may be split into to sub-tasks. The algorithm may take into consideration exemplary factors such as the power of the WMC device 102 including the battery lifetime, the information received from the remote device, and/or the processing capability/load of the WMC device 102. Other exemplary consideration may comprise available bandwidth of the link between the WMC device 102 and the remote device 104, and other parameters related to the link, including but limited to, QOS. In step 314, the split feasibility may be ascertained, and it may be determined whether a split is possible. This may comprise determining whether the job may be split based on the algorithm, and whether the connectivity and/or availability of the remote device 104 permit sending a sub-task, and receiving a result. In instances where it may be determined that a split is possible, the process may proceed to step to step 308, where the process is done. The WMC device 102 may not attempt to apportion any tasks to remote device 104, and the WMC device 102 may attempt to perform the requested job completely.

In instances where it may be determined that a split is possible, the process may proceed to step 316. In step 316, the requested job is split into sub-tasks, wherein some of the task may be assigned to the remote device 104. In step 318, the assigned sub-tasks may be sent to the remote device 104. The process may then proceed to step to step 308, where the process is done. The WMC device 102 may WMC device 102 may attempt to perform any tasks that were not assigned to the remote device 104 and/or may wait for returned any results that may be sent back from the remote device 104 after completing the tasks that the WMC device may have assigned and sent to the remote device in step 318.

Figure 4:
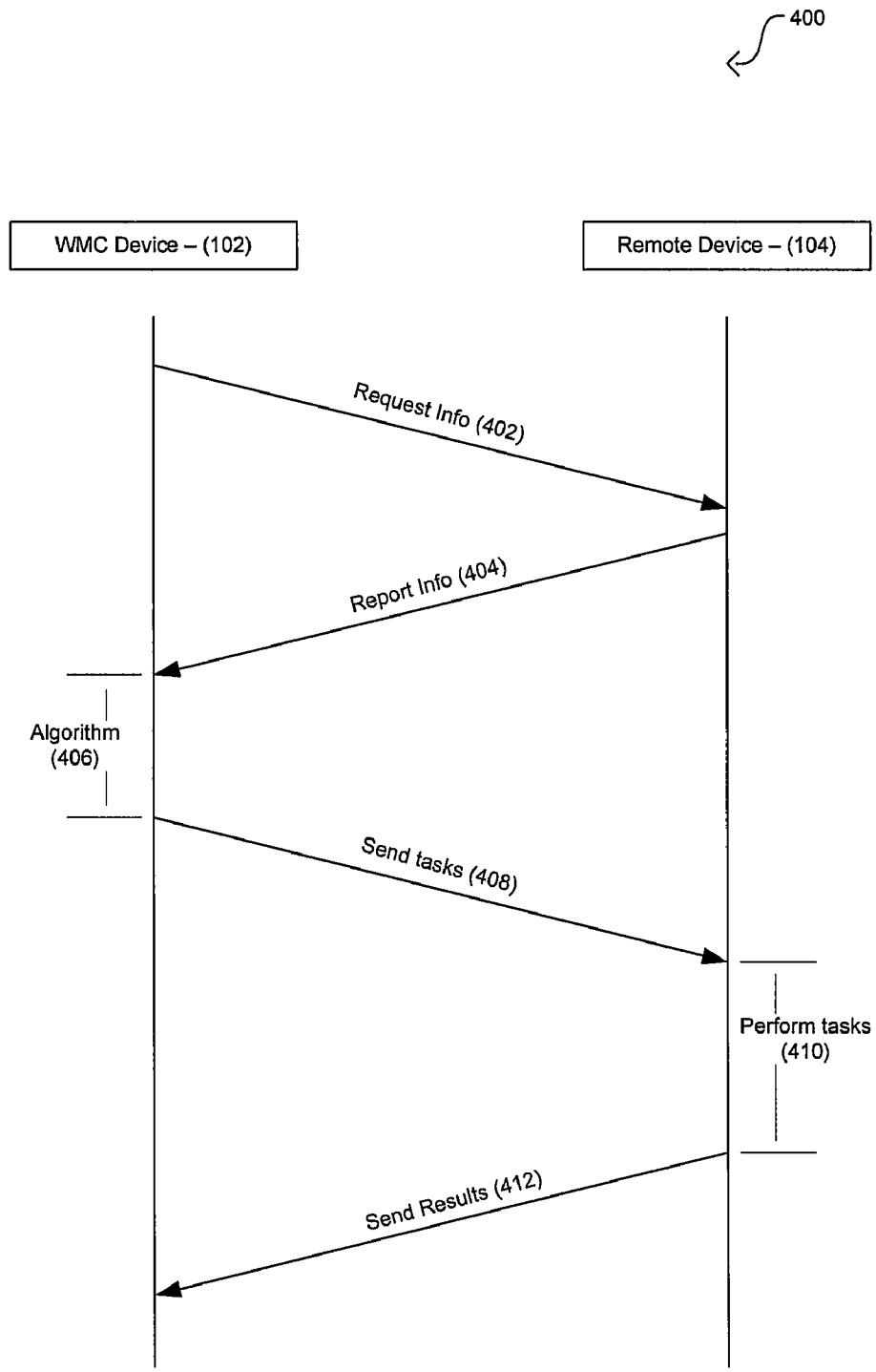
FIG. 4 is a flow diagram that illustrates an exemplary application of job splitting algorithm between a wireless mobile communication (WMC) device and a remote device, in accordance with an embodiment of the invention.

FIG. 4 is a flow diagram that illustrates an exemplary application of job splitting algorithm between a wireless mobile communication (WMC) device and a remote device, in accordance with an embodiment of the invention. Referring to FIG. 4, there is shown a flow chart 400. The process may initiate in the WMC device 102 when a job is requested. In step 402, an information request may be communicated from the WMC device to the remote device. This request may comprise a request to report on information relevant to the job splitting algorithm in the WMC device 102. Exemplary information may comprise parameters such as processing load in the remote device 104. In step 404, an information report may be sent from the remote device 404 to the WMC device. An exemplary information report may comprise the information request by the WMC device 102, and may also comprise additional information that the remote device 104 determines to be relevant to the job splitting algorithm. In step 406, the job splitting algorithm may be performed. The job splitting algorithm may comprise determining the viability of splitting the job into one or more tasks wherein some of the tasks may be assigned to remote devices. In step 408, the WMC device 102 may communicate one or more tasks or portions thereof to the remote device 104. In step 410, the remote device 104 may perform the tasks or portions thereof that may be communicated from the WMC device 102. In step 412, the remote device 104 may send the results of performing the task or portions thereof to the WMC device 102.

Various embodiments of the invention may comprise a method and system for dynamically splitting jobs in wireless system, and may comprise evaluating a job that a wireless mobile communication device may be requested to do. A wireless mobile communication (WMC) device 102 may perform job splitting algorithm in exemplary step 406 to evaluate a job the WMC device 102 may be requested to perform. The job splitting algorithm may enable determining one or more tasks that may be assigned to a remote device 104. The job splitting algorithm in the exemplary step 406 may be based on information pertaining to the WMC device 102 itself, information relating to the connection between the WMC device 102 and the connecting system 106 and/or the remote device 104, and information pertaining to the remote device 104 itself. This information may comprise such information as power in the WMC device 102, processing capabilities of the remote device 104 and the WMC device 102, parameters pertaining to the connection, direct and/or indirect, such as available bandwidth and allowable QOS. In instances when the outcome of executing the job splitting algorithm in the exemplary step 406 indicates that it may be optimal to split the requested job, the job may be split and one or more tasks may be sent to the remote device 104. Upon completion, the remote device 104 may send any necessary outcomes back to the WMC device 102.

Another embodiment of the invention may provide a machine-readable storage, having stored thereon, a computer program having at least one code section executable by a machine, thereby causing the machine to perform the steps as described herein for dynamically splitting jobs across multiple agnostic processors in wireless system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A method for improving performance of wireless devices, the method comprising:
    evaluating via a wireless mobile communication device, availability of at least local resources of said wireless mobile communication device for processing of one or more tasks corresponding to a job being handled by said wireless mobile communication device; and
    apportioning via said wireless mobile communication device said processing of said one or more tasks between said wireless mobile communication device and a remote device based on availability of connectivity between said devices, and/or capability of said wireless mobile communication device and said availability of said at least local resources.

2. The method according to claim 1, wherein said resources and/or capability of said wireless mobile communication comprise power availability in said wireless mobile communication device.

3. The method according to claim 1, wherein said resources and/or capability comprise power requirement for performing said one or more tasks in said wireless mobile communication device.

4. The method according to claim 1, wherein said resources and/or capability comprise power requirement for apportioning said one or more tasks to said remote device.

5. The method according to claim 1, wherein said resources and/or capability comprise processing load of said remote device.

6. The method according to claim 1, wherein said resources and/or capability comprise processing load of said wireless mobile communication device.

7. The method according to claim 1, wherein said availability of connectivity comprises bandwidth limitation of a wireless link that said wireless mobile communication device utilizes to communicate with said remote device.

8. The method according to claim 1, wherein said availability of connectivity comprises available quality of service (QOS) of a wireless link that said wireless mobile communication device utilizes to communicate with said remote device.

9. The method according to claim 1, wherein said resources and/or capability comprise memory storage limitation of said wireless mobile communication device.

10. A machine-readable storage having stored thereon, a computer program having at least one code section for improving performance of wireless devices, the at least one code section being executable by a machine for causing the machine to perform steps comprising:

evaluating via a wireless mobile communication device, availability of at least local resources of said wireless mobile communication device for processing of one or more tasks corresponding to a job being handled by said wireless mobile communication device; and apportioning via said wireless mobile communication device said processing of said one or more tasks between said wireless mobile communication device and a remote device based on availability of connectivity between said devices, and/or capability of said wireless mobile communication device and said availability of said at least local resources.

11. The machine-readable storage according to claim 10, wherein said resources and/or capability of said wireless mobile communication comprise power availability in said wireless mobile communication device.

12. The machine-readable storage according to claim 10, wherein said resources and/or capability comprise power requirement for performing said one or more tasks in said wireless mobile communication device.

13. The machine-readable storage according to claim 10, wherein said resources and/or capability comprise power requirement for apportioning said one or more tasks to said remote device.

14. The machine-readable storage according to claim 10, wherein said resources and/or capability comprise processing load of said remote device.

15. The machine-readable storage according to claim 10, wherein said resources and/or capability comprise processing load of said wireless mobile communication device.

16. The machine-readable storage according to claim 10, wherein said availability of connectivity comprises bandwidth limitation of a wireless link that said wireless mobile communication device utilizes to communicate with said remote device.

17. The machine-readable storage according to claim 10, wherein said availability of connectivity comprises available quality of service (QOS) of a wireless link that said wireless mobile communication device utilizes to communicate with said remote device.

18. The machine-readable storage according to claim 10, wherein said resources and/or capability comprise memory storage limitation of said wireless mobile communication device.

19. A system for improving performance of wireless devices, the system comprising:

at least one processor that enables evaluating via a wireless mobile communication device, availability of at least local resources of said wireless mobile communication device for processing of one or more tasks corresponding to a job being handled by said wireless mobile communication device; and said at least one processor enables apportioning, via said wireless mobile communication device, said processing of said one or more tasks between said wireless mobile communication device and a remote device based on availability of connectivity between said devices, and/or capability of said wireless mobile communication device and said availability of said at least local resources.

20. The system according to claim 19, wherein said resources and/or capability of said wireless mobile communication comprise power availability in said wireless mobile communication device.

21. The system according to claim 19, wherein said resources and/or capability comprise power requirement for performing said one or more tasks in said wireless mobile communication device.

22. The system according to claim 19, wherein said resources and/or capability comprise power requirement for apportioning said one or more tasks to said remote device.

23. The system according to claim 19, wherein said resources and/or capability comprise processing load of said remote device.

24. The system according to claim 19, wherein said resources and/or capability comprise processing load of said wireless mobile communication device.

25. The system according to claim 19, wherein said availability of connectivity comprises bandwidth limitation of a wireless link that said wireless mobile communication device utilizes to communicate with said remote device.

26. The system according to claim 19, wherein said availability of connectivity comprises available quality of service (QOS) of a wireless link that said wireless mobile communication device utilizes to communicate with said remote device.

27. The system according to claim 19, wherein said resources and/or capability comprise memory storage limitation of said wireless mobile communication device.

* * * * *